United States Patent [19]
Pflaum

[11] 3,826,973

[45] July 30, 1974

[54] ELECTROMAGNETIC GRADIOMETER

[75] Inventor: Norman C. Pflaum, Miami, Fla.

[73] Assignee: Richard Benson, Miami, Fla.; a part interest

[22] Filed: Jan. 10, 1973

[21] Appl. No.: 322,400

[52] U.S. Cl............................ 324/3, 324/6, 324/41
[51] Int. Cl......................... G01v 3/10, G01r 33/02
[58] Field of Search............................... 324/3–6, 8, 324/41, 67

[56] References Cited
UNITED STATES PATENTS

| | | | |
|---|---|---|---|
| 2,376,610 | 5/1945 | Millington | 324/5 |
| 2,557,994 | 6/1951 | Ostlund | 324/3 |
| 2,744,232 | 5/1956 | Shawhan et al. | 324/3 |
| 2,858,505 | 10/1958 | Shawhan | 324/41 |
| 3,015,060 | 12/1961 | McLaughlin et al. | 324/4 |
| 3,020,470 | 2/1962 | Shawhan et al. | 324/3 |
| 3,471,772 | 10/1969 | Smith | 324/3 |

Primary Examiner—Gerard R. Strecker

[57] ABSTRACT

An electromagnetic gradiometer includes a pair of co-axial pickup coils arranged on opposite sides of a transmitter coil for deriving a magnetic field in response to a fixed frequency a.c. source. The pickup coils are connected to null circuitry which derives a substantially zero a.c. voltage in response to neither a ferrous nor a conductive body being in the field. In response to ferrous and conducting bodies being in the field, non-zero a.c. voltages having phases displaced relative to each other are produced. Detection circuitry responds to the amplitude and phase of the voltage derived from the pickup coils to generate aural outputs at two different frequencies which enable the ferrous and conductive bodies to be easily distinguished even though the device scans rapidly over an area. Quantitative phase information, derived by a phase comparator, is provided by a meter to provide a characteristic signature of the electrical and physical characteristics of a detected object, so the object can be identified. The nulling circuit includes a two-tap resistive voltage divider connected in shunt across output terminals of the two pickup coils. First and second of the taps are respectively connected via a resistor and a capacitor to a common terminal for the windings.

15 Claims, 4 Drawing Figures

ELECTROMAGNETIC GRADIOMETER

FIELD OF INVENTION

The present invention relates generally to electromagnetic gradiometers and more particularly to an electromagnetic gradiometer for detecting and distinguishing between ferrous and conductive bodies.

BACKGROUND OF THE INVENTION

Electromagnetic systems and gradiometers are known in the art, as exemplified by U.S. Pat. Nos. 2,744,232, 2,915,699, 3,020,470 and 3,471,772. Typically, systems of the type shown by these patents include an excitation coil driven from a fixed, constant frequency a.c. source and a pair of pickup coils connected in a differential relationship. In response to the two pickup coils being loaded in the same manner relative to the excitation coil, i.e., a balanced condition, as exists in response to neither a ferrous nor a conductive body being in the area being monitored by the gradiometer, a virtually null output is derived from the differential coils. To compensate for coil variations which occur, for example, as a function of temperature, relatively complex nulling circuitry may be provided to assure the derivation of a zero output for the balanced condition. In response to differential loading of the two pickup coils, i.e., an unbalanced condition, as occurs in response to a ferrous or conductive body being in the area monitored, a finite, non-zero voltage is derived between the two pickup coils. In response to a ferrous body being in the field, the non-zero differential voltage has a first phase relative to the excitation voltage phase. In response to highly conductive body being in the monitored area, the magnetic field causes eddy currents to be induced in the conductive body to cause a significant change in phase relative to the voltage derived for a ferrous body. For bodies having intermediate conductivity and ferrous properties, the phase shift is between the two extreme values.

Generally prior art systems of this type have failed to provide a facile arrangement for distinguishing between ferrous and conductive bodies and for enabling such bodies to be easily located. In general, the prior art has relied solely upon phase displacement of a differential signal to activate an output device which may be either of the visual or aural type. Further, some of the prior art devices have required relative manipulation between the excitation and pickup coils in order to distinguish between ferrous and conductive bodies and locate same.

BRIEF DESCRIPTION OF THE INVENTION

In accordance with the present invention, a simplified system for detecting and distinguishing between ferrous and conductive, non-ferrous bodies and for locating these bodies includes means for responding to the amplitude, as well as the phase, of a voltage derived from a pickup coil means magnetically coupled with an excitation coil driven by a fixed, constant frequency source. In response to a first phase relationship subsisting between the excitation coil voltage and the pickup coil voltage, an aural tone of a first, predetermined frequency is derived to indicate detection of a ferrous body. The amplitude of the first aural frequency is varied in response to the amplitude of the voltage derived from the pickup coil to provide an indication of the magnitude of the magnetic unbalance, which in turn is a function of the geometry, orientation and particularly distance of the ferrous body from the coil assembly. In response to a conductive body being in the magnetic field between the excitation and pickup coils, the resulting phase displacement causes the frequency, i.e., tone, of the aural signal to shift from the frequency associated with detection of a ferrous body, whereby an operator is provided with a definite indication of a conductive body being detected. The aural signal associated with the second frequency is always derived at constant amplitude, but a measure of the conductivity, orientation, geometry and location of the conductive target is derived by providing a meter driven by a phase comparator which causes the aural tone frequency shift. The aural tone amplitude is controlled so that, in response to a balanced condition being sensed by the pickup coil, no aural signal is derived.

The presence or absence of aural tones at two different frequencies enables the operator to scan a particular area under investigation at a very rapid rate. In response to an aural tone being derived during the rapid scan operation, the operator repeats the scan at a relatively slow rate, while observing the sound intensity and frequency, as well as the meter deflection to enable the ferrous or conductive body to be located and identified with relatively great precision.

A further feature of the invention resides in an extremely simple and easily adjusted nulling circuit for compensating impedance variations of a pair of differentially connected pickup coils, which variations result from changes in ambient conditions or inconsistencies in manufacture. The nulling circuit comprises two resistive voltage dividers connected in shunt across output leads of the two pickup coils. The resistive voltage divider means includes a pair of taps, one of which is connected through a resistor to a common, shielded lead for the two pickup windings, while the other is connected through a capacitor to the common lead. The resistance and capacitor connected to the two taps provide zero and 90° phase shifts for voltages developed at the taps so that compensation for resistive and reactive changes of the pickup coil assembly can be provided merely by changing the positions of the taps. The taps, resistive voltage dividers and impedances connected between the taps and the common terminal are arranged in a bridge-like circuit to provide the desired null characteristic.

A further feature of the invention is that sensitivity of the system to distinguish between ferrous and non-ferrous, conductive metals can be varied as desired. Variable sensitivity is important in monitored host regions having relatively high conductivity, such as salt water. To this end, a threshold detector having a variable input setting responds to the output of the phase detector to control the frequency of the aural tone. Only in response to the phase shift exceeding a predetermined level, controlled by the operator as desired and as a function host medium conductivity, is the aural frequency shifted to indicate the presence of a conductive body, rather than a ferrous body.

A further feature of the invention relates to the ability of the system to detect certain ferrous and conductive non-ferrous bodies in a medium having a relatively high magnetic permeability, as occurs in certain mineralized soils. In a highly sensitive system, the high magnetic permeability of the host medium may result in a sufficient unbalance between the two pickup coils to cause an input amplifier to be saturated and thereby prohibit recognition of ferrous or non-ferrous highly conductive bodies within the host medium. By reducing the gain of the amplifier under such circumstances, certain high conductivity and ferrous bodies cause a detectable output of the amplifier to enable the two different aural signals to be derived.

It is, accordingly, an object of the present invention to provide a new and improved electromagnetic gradiometer device for detecting and distinguishing between conductive and ferrous bodies and for locating same.

An additional object of the invention is to provide a new and improved device for detecting and distinguishing between ferrous and conductive bodies and for locating same, wherein different distinguishable signals responsive to the phase and amplitude of a magnetic field passing through the body are employed.

An additional object is to provide new and improved circuitry for nulling a pair of differential coils having impedance characteristics that are susceptible to change and not consistent from one unit to the next during manufacture.

The above and still further objects, features and advantages of the present invention will become apparent upon consideration of the following detailed description of one embodiment thereof, especially when taken in conjunction with the accompanying drawing.

DETAILED DESCRIPTION OF THE DRAWING

The detailed description of the invention is concerned with a portable device particularly adapted to locate sub-surface conductive and ferrous bodies, such as pipelines, cables, lost articles, treasures and archeological finds, as well as mineralize deposits or contaminants. It is to be understood, however, that the principles of the invention are equally applicable to systems wherein the requirement for portability does not exist, such as in industrial applications or personnel surveillance for, e.g., detecting concealed ferrous and non-ferrous, conductive weapons.

Figure 1:
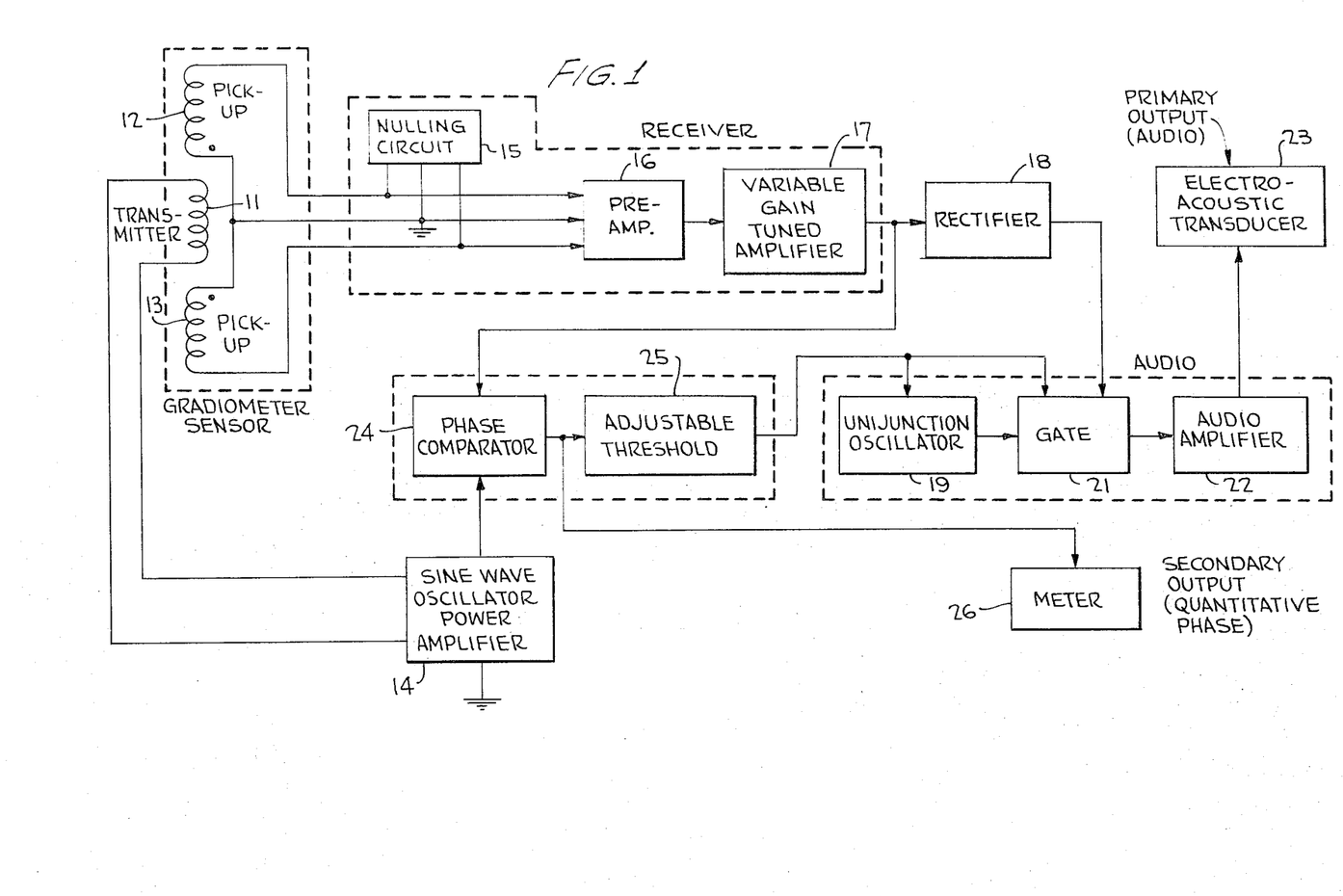
FIG. 1 is a block diagram of a preferred embodiment of the invention.

Reference is now made to the block diagram of FIG. 1 wherein there is illustrated a centrally located transmitting coil 11 and pickup coils 12 and 13, which are coaxial with each other and transmitter coil 11. Pickup coils 12 and 13 are fixedly and permanently mounted on opposite sides of similarly mounted transmitting coil 11; the pickup coils are wound in opposite directions relative to each other, with opposite ends being connected in a differential relationship. The other ends of pickup coils 12 and 13 have a common ground connection that extends to each of the other circuit elements illustrated in FIG. 1.

Transmitter coil 11 is connected to be excited by a fixed, constant frequency sine wave source, which preferably derives a frequency in the audio range. Sine wave source 14 comprises a stable oscillator which drives the excitation winding through a power amplifier tuned to the frequency of the oscillator. Pickup coils 12 and 13 are positioned relative to transmitting coil 11 in such a manner that in response to a balanced impedance subsisting between the transmitter coil and each of the pickup coils a zero, null voltage is derived between the opposite ends of the pickup coils. In response to either a ferrous or conductive, non-ferrous body being in the region scanned by the assembly including coils 11-13, a finite, non-zero voltage is derived between the opposite ends of pickup coils 12 and 13. The non-zero voltage is derived because of an unbalanced magnetic coupling between the two pickup coils 12 and 13; the unbalance occurs due to the electromagnetic gradient resulting from the closer proximity between the conductive or ferrous body and one of the pickup coils relative to the other pickup coil.

Coils 11-13 are preferably mounted on a dielectric, non-magnetic temperature stable cylinder (not shown), which may be fabricated from certain glasses, so that there is an air core coupling the magnetic fields of transmitter coil 11 to each of pickup coils 12 and 13. Pickup coils 12 and 13 are arranged vertically on the cylinder with respect to transmitter coil 11, so that all of coil 12 is above the transmitter coil and all of coil 13 is below the transmitter coil. It is to be understood, however, that in certain instances it may be desired to change the orientation of the pickup and transmitter coils 11-13 so that they are coplanar or otherwise disposed. In response to a ferrous body causing the magnetic unbalance, the finite voltage developed between the opposite ends of coils 12 and 13 has a first, substantially predetermined phase relative to the phase of the sine wave derived from oscillator 14. In response to a conductive body causing the unbalance, the finite voltage developed between the opposite ends of the pickup coils is variable over a relatively wide range, which is distinguishable from the predetermined phase resulting from a ferrous body causing the unbalance.

Because pickup coils 12 and 13 have a tendency to change impedance with respect to each other and transmitter coil 11 as a function of ambient conditions (particularly temperature) and difficulties in manufacturing all of the assemblies of coil 11-13 do not have precisely the same characteristics, the opposite ends of the pickup coils are connected to nulling circuit 15. Nulling circuit 15 includes a network whereby a relatively exact zero voltage is derived from it in response to neither a conductive nor a ferrous body being in the magnetic field coupling transmitter coil 11 to pickup coils 12 and 13. Null circuit 15 includes adjustable impedance elements for compensating impedance changes of the coil assembly including windings or coils 11-13.

The a.c. output of the pickup coils 12 and 13, after being zeroed by the nulling circuit 15, is coupled to a pair of cascaded a.c. amplifiers 16 and 17. Amplifier 16 is a preamplifier having a fixed gain and relatively wide bandwidth, while amplifier 17 is a variable gain device with a narrow band pass at a center frequency approximately equal to the frequency of the sine wave applied by oscillator 14 to transmitter coil 11. The a.c. output of variable gain amplifier 17 is a sine or clipped wave indicative of the amplitude and phase derived between the opposite ends of coils 12 and 13. If the coil assembly is traversing a medium having a contaminated high magnetic permeability, such as certain mineralized soils, the gain of amplifier 17 is adjusted to a relatively low level, to enable certain conductive and ferrous targets to be distinguished from the contaminated medium being traversed. However, if it is desired to provide optimum sensitivity and enable small, conductive and ferrous bodies to be detected in an uncontaminated medium, the gain of amplifier 17 is adjusted to a high level.

The variable amplitude signal derived from amplifier 17 is fed to rectifier 18. Rectifier 18 derives a d.c. signal having an amplitude approximately proportional to the amplitude of the a.c. signal derived from variable gain, tuned amplifier 17. In response to the phase of the signal derived from amplifier 17 indicating that a ferrous object is in the magnetic field of the coil assembly, the amplitude of the d.c. signal derived from rectifier 18 controls the amplitude of an audio frequency, $F_1$, derived from a free running relaxation oscillator 19. The amplitude of the output of variable gain, tuned amplifier 17 controls the amplitude of the $F_1$ component derived from oscillator 19 so that the $F_1$ component is fed with increased amplitude through variable gain gate 21 as the ferrous signal increases. For a null output of amplifier 17, oscillator 19 derives the $F_1$ component which is blocked by gate 21. To these ends, the gain of gate 21 is controlled by the output voltage of rectifier 18 to increase from zero as the rectifier output increases from zero. The output of variable gain gate 21 is fed to audio amplifier 22 which drives electroacoustic transducer 23, which derives an aural output having a frequency and amplitude that is an approximate replica of the audio frequency signal supplied to amplifier 22.

In response to a conductive object causing an unbalance between coils 12 and 13, speaker 23 derives an aural tone having a constant amplitude and frequency, $F_2$, which is easily distinguishable by the ear from the frequency $F_1$. To this end, the a.c. output of coils 12 and 13 is applied without phase shift via amplifiers 16 and 17, as one input to phase comparator 24, the other input of which is responsive to an output of oscillator 14. The output of oscillator 14 applied to phase comparator 24 has the same frequency as the sine wave applied by the oscillator to transmitting coil 11, but in phase shifted relative to the wave applied to the transmitting coil. The phase shifted wave applied to phase comparator 24 in response to the output of oscillator 14 functions as a switching voltage to open and close electronic switches in the phase comparator. Phase comparator 24 derives a d.c. voltage proportional to the phase angle of the a.c. output of variable gain, tuned amplifier 17 relative to the predetermined phase indicative of a ferrous object causing the unbalance of coils 12 and 13. Phase comparator 24 is arranged so that zero and maximum d.c. levels are derived by it in response to bodies respectively having a high magnetic permeability and high conductivity causing the unbalance.

The d.c. voltage derived by phase comparator 24 is applied to a variable threshold circuit 25, which derives a bilevel signal indicative of whether the threshold thereof has or has not been exceeded. The threshold of circuit 25 is adjusted by the operator as a function of the conductivity of the medium through which the magnetic field of the coil assembly is passing. If the medium has a relatively high conductivity, such as exists for a salt water background, the threshold level is set at a relatively high level because the medium causes a significant phase shift in the a.c. output of tuned amplifier 17.

In response to the threshold of circuit 25 being exceeded, the circuit derives a binary one signal which is applied in parallel to a frequency control input terminal of relaxation oscillator 19 and gate 21. The binary one signal applied to oscillator 19 activates the oscillator so that the oscillator derives the frequency $F_2$; with a binary zero signal fed by threshold circuit 25 to the oscillator, the oscillator derives the $F_1$ frequency. The binary one signal fed to gate 21 drives the gate to a full open condition, whereby the $F_2$ frequency of oscillator 19 is passed through the gate at constant amplitude to audio amplifier 22 and speaker 23. The d.c. variable gain control signal derived from rectifier 18 has no effect on the signal passed through gate 21 when the binary one signal is applied to the gate by threshold circuit 25.

To provide a visual indication of the phase shift resulting from a conductive body being in the monitored region, the d.c. output of phase comparator 24 is fed to d.c. voltmeter 26. Voltmeter 26 provides a quantitative signature of the electrical and physical characteristics of the detected object, thereby aiding in the identification thereof. When the signal level is above a certain threshold the phase information is independent of distance. In response to a pure ferrous target, there is a null reading of phase indicating meter 26, but the intensity of an aural tone is varied in accordance with the imbalance caused by the target. To locate and identify an object the coil assembly is scanned using conventional scan techniques and an operator observes the frequency and amplitude of aural tones, as well as the meter output.

Figure 2A:
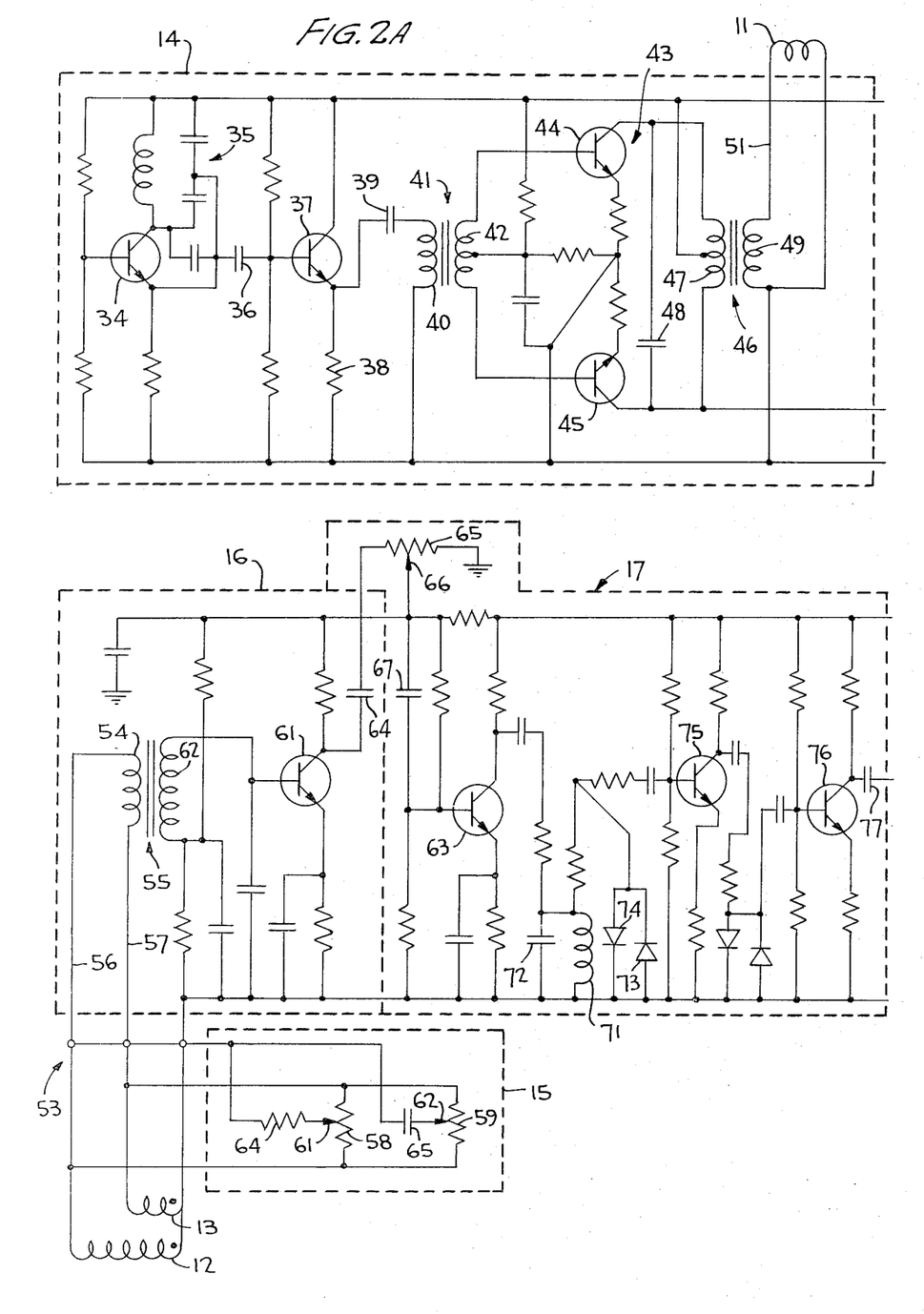
FIGS. 2A and 2B are a detailed circuit diagram of the system illustrated in FIG. 1.
Figure 2B:
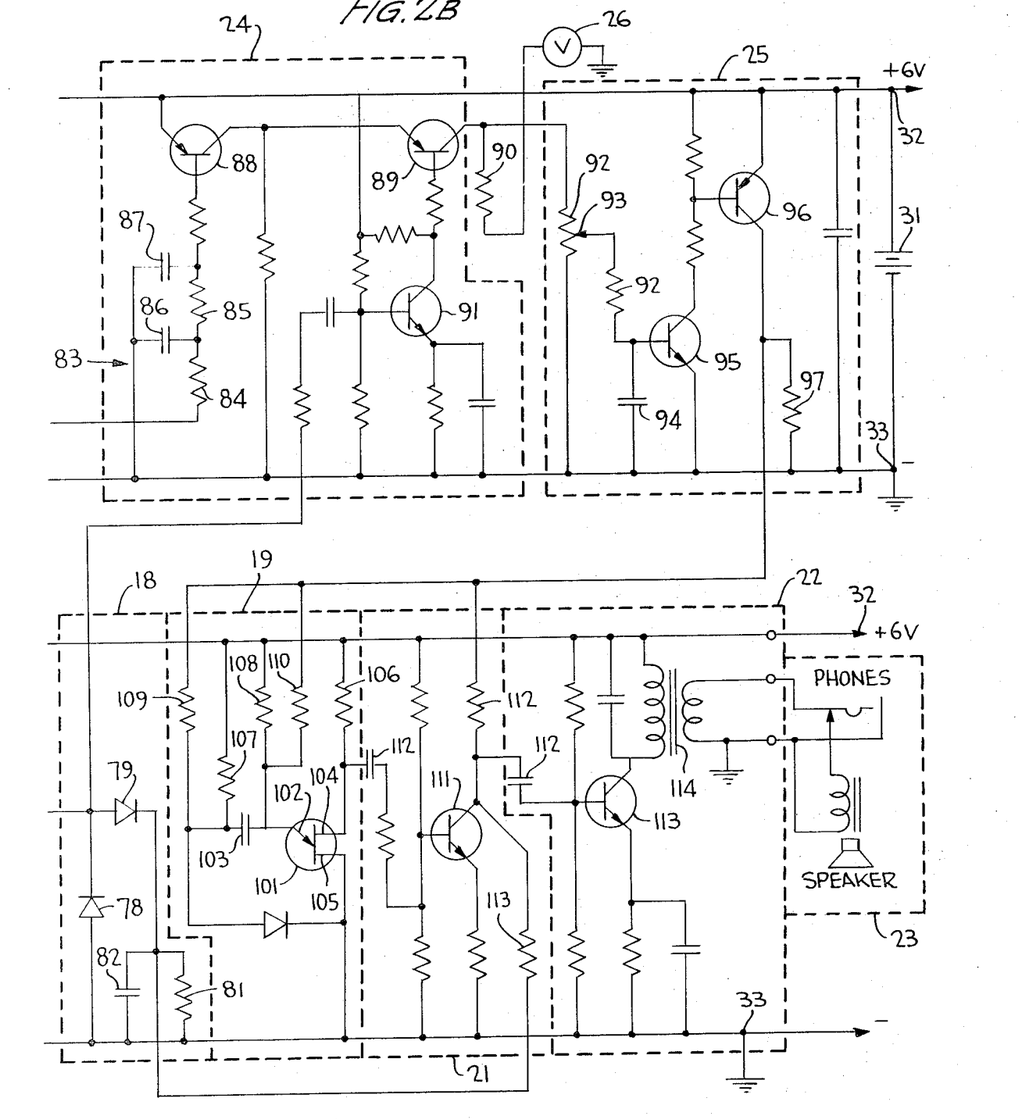

Reference is now made to FIG. 2 of the drawing wherein there is illustrated a detailed circuit diagram of the system illustrated in FIG. 1. The circuit of FIG. 2 is powered exclusively by a 6 volt, d.c. battery source 31 connected between plus terminal 32 and ground terminal 33. The 6 volt source between terminal 32 and 33 supplies collector emitter potential for the transistors included in the various circuits, each of which transistors is of the NPN type unless otherwise indicated.

Oscillator and power amplifier 14 comprise an oscillating stage comprising transistor 34 connected in a modified Colpitts configuration including collector tuned circuit 35, whereby audio frequency oscillations are derived and a.c. coupled via capacitor 36 to emitter follower transistor stage 37. A.C. voltage developed across load resistor 38 of emitter follower 37 is a.c. coupled via capacitor 39 to primary 40 of transformer 41, the secondary 42 of which drives a push-pull power amplifier 43 comprising transistor 44 and 45 and output transformer 46. Shunting primary winding 47 of transformer 46 is capacitor 48, whereby a sine wave at the oscillation frequency (in one embodiment 7 KHz) of transistor 34 is developed across transformer secondary winding 49 which is connected via a shielded cable 51 to transmitting coil 11. The shield of cable 51 is connected to ground terminal 33.

Pickup coils 12 and 13 are connected to nulling circuit 15 via a shielded cable 53 having a shield connected to ground terminal 33 and a common, center point for the two pickup coils. Opposite ends of the pickup coils 12 and 13 are connected to opposite ends of primary winding 54 of transformer 55 via leads 56 and 57 included in shielded cable 53.

Nulling circuit 15 includes a resistive voltage divider means comprising slide wires 58 and 59 having variably positioned taps 61 and 62. Opposite ends of slide wires 58 and 59 are connected to shunt leads 56 and 57. Taps 61 and 62 are connected to the shield of cable 53 via resistor 64 and capacitor 65, respectively. Resistor 64 and capacitor 65 respectively introduce zero and −90° phase shifts for the a.c. voltages at taps 61 and 62, as coupled to the shield.

The circuitry associated with each of slide wires 58 and 59, in effect, comprises two bridge circuits to provide nulling for the resistive and reactive impedance unbalance between pickup coils 12 and 13, which may occur because of temperature variations or the inability to initially fabricate the pickup coils to have exactly identical impedances. Slider 61 is positioned so that it, in effect, provides a resistive balance for the real impedance component of the unbalance between pickup coils 12 and 13. Tap 62 is positioned to compensate for the phase error introduced by the reactive or imaginary impedance component unbalance between pickup coils 12 and 13. The phase unbalance is compensated by a ±90° phase lag introduced by capacitor 65 and divider 59. Capacitor 65 provides a −90° phase shift, but since the capacitor is connected across both of coils 12 and 13 via potentiometer 59, the movement of tap 62 from one side of the other yields an effective ±90° phase shift, enabling the nulling of both inductive and capacitive offsets.

Sliders 61 and 62 are adjusted so that if neither a ferrous nor a conductive body is in the magnetic field coupling transmitting coil 11 with receiving coils 12 and 13, a zero voltage is derived between leads 56 and 57. In response to an unbalance in the magnetic field due to eddy currents being induced in a conductive body, a finite voltage is developed between leads 56 and 57 and coupled to primary winding 54 with a phase which varies as a function of the conductivity, geometry, orientation, and possibly separation of the conductive body from the coil assembly. The phase is a function of separation only if the amplitude exceeds the threshold established by circuit 25; for amplitude within the threshold limit, phase is essentially independent of distance between the coil assembly and target. In response to a ferrous body causing an unbalance, a finite voltage is developed across leads 56 and 57 at a predetermined phase; the amplitude of the voltage is dependent upon the geometry, target orientation and separation of the ferrous body from the coil assembly.

The nulled signal developed across primary winding 54 is a.c. coupled via transformer 55 and its secondary winding 62 to fixed gain preamplifier 16 that comprises common emitter transistor 61. The collector of preamplifier transistor 61 is connected via a.c. coupling capacitor 64 to the base of variable gain, tuned amplifier 17, which comprises common emitter transistor 63, 75, and 76. The gain of transistor stage 63 is determined by the setting of potentiometer 65 which is connected between one electrode of capacitor 64 and ground. Potentiometer 65 includes a variably positioned slide wire 66 that is a.c. coupled to the base of transistor 63 via coupling capacitor 67.

The position of slider 66 is adjusted as a function of the magnetic permeability of a host medium being scanned by the coil assembly. In a host medium having a high magnetic permeability, slider 66 is adjusted so that a small portion of the voltage developed across potentiometer 65 is fed to the base of transistor 63, whereby the possibility of driving the transistor into saturation becasue of the permeability of the medium is prevented, while enabling detection of certain ferrous and conductive bodies in the medium. If the host medium has very low magnetic permeability and it is desired to have the greatest possible sensitivity, the position of slider 66 is adjusted so that the entire voltage developed across potentiometer 65 is coupled to the base of transistor 63.

Tuning is provided for the filter of the variable gain cascade amplifier 17 comprising transistors 63, 75, and 76 by a tank circuit including inductance 71 and capacitor 72. The voltage developed across the tank circuit is shaped by back-to-back parallel clipping diodes 73 and 74 and a.c. coupled to the base of a further transistor stage comprising transistor 75. The output voltage developed across the collector of transistor stage 75 is a.c. coupled to an additional transistor stage comprising transistor 76; the circuitry associated with transistor stage 76 is identical with that associated with stage 75. If the essentially sine wave variations at the collector of transistor 63 exceed a predetermined level, the clipping diodes of stages 75 and 76 shape the variations into square waves that enable phase comparator 24 to function more accurately and independently of voltage magnitude.

The a.c. voltage developed at the collector of transistor 76 is coupled to half wave rectifier 18 via coupling capacitor 77. Rectifier 18 includes shunt diode 78 and series diode 79 which are poled to shunt each negative half cycle to ground terminal 33 and pass each positive half cycle to a low pass filter. The low pass filter comprises the parallel combination of resistor 81 and capacitor 82, across which is developed a d.c. voltage proportional to the amplitude of the a.c. voltage derived from the collector of transistor 76.

The a.c. voltage derived at the collector of transistor 76 is also fed through capacitor 77 to one input of phase comparator 24, the other input of which is responsive to a replica of the a.c. voltage fed to transmitting coil 11, as derived from the collector of transistor 45. Phase comparator 24 includes a 90° phase shifter 83 that is d.c. coupled to the collector of transistor 45 and comprises a pair of cascaded phase lag circuits comprising series resistors 84 and 85 and shunt capacitors 86 and 87. The 90° phase shifted voltage derived from phase shifter 83 is d.c. coupled to the base of common emitter, PNP transistor 88, the collector of which is d.c. coupled to the emitter of PNP transistor 89.

During alternate half cycles of finite voltages coupled to transformer winding 54 by pickup coils 12 and 13, the emitter collector path of transistor 89 is driven into a conducting state. To this end, the voltage coupled through capacitor 77 is a.c. coupled to the base of transistor 91, the collector of which is d.c. coupled to the base of transistor 89. During the half cycle when diode 79 is activated into a conducting state the collector voltage of transistor 91 is negative to enable the emitter collector path of transistor 89 to be forward biased, depending upon the phase of the voltage applied to the emitter thereof. Hence, there is developed at the collector of transistor 89 a d.c. voltage having a magnitude indicative of the phase displacement between the two a.c. signals applied to the phase comparator. Sufficient gain is provided by the circuitry to enable the amplitude of the d.c. voltage developed at the collector of transistor 89 to be virtually independent of the amplitude of the finite voltage developed between pickup coils 12 and 13. The voltage at the collector of transistor 89 is d.c. coupled to d.c. voltmeter 26 via resistor 90.

The d.c. voltage developed at the collector of transistor 89 is coupled to adjustable threshold circuit 25 that includes a slide wire 82 which is connected between the collector of transistor 89 and ground. Slide wire 92 includes a variably positioned tap 93 across which is connected smoothing capacitor 94, so that the voltage developed across capacitor 94 is indicative of and proportional to the average voltage developed at collector 89. Tap 93 is set on slide wire 92 at a position determined by the conductivity of the medium being monitored by the coil assembly. For a highly conductive host medium, which has a tendency to introduce a significant relatively constant phase shift, slider 93 is positioned so that a relatively small portion of the voltage developed across potentiometer 92 is coupled to capacitor 94; if the host medium has a relatively low conductivity and great sensitivity is desired, slider 93 is positioned so that the maximum voltage developed across slide wire 92 is coupled to capacitor 94.

The voltage developed across capacitor 94 is fed to a two stage, high gain d.c. amplifier comprising transistor 95 and PNP transistor 96, the base of which is connected to the collector of transistor 95. The base of transistor 95 is connected to be responsive to the voltage developed across capacitor 94, whereby transistor 95 is driven into a conducting state in response to the voltage across capacitor 94 exceeding a predetermined level, determined by the phase difference between the inputs to phase comparator 24 and the position of slider 93. The base of transistor 96 is biased and connected to the collector of transistor 95 so that the former transistor is driven into saturation and cutoff in response to conduction and cutoff of the latter transistor. In response to transistor 96 being respectively saturated and cutoff its collector swings from approximately the plus d.c. voltage at terminal 32 to ground.

The bilevel signal voltages developed at the collector of transistor 96 control the oscillation frequency of relaxation oscillator 19. Oscillator 19 includes unijunction transistor 101, having an emitter 102 connected to charging capacitor 103 and bases 104 and 105 which are connected in series between plus 6 volt terminal 32 and ground 33 via load resistor 106. Constant bias for emitter 102 is provided by connecting the electrodes of capacitor 103 to the plus 6 volt source at terminal 32 via resistor 107 and 108. Variable bias is provided by connecting the electrodes of capacitor 103 to the collector of transistor 96 via resistors 109 and 110. In response to the collector voltage of transistor 96 being at ground potential, capacitor 103 is charged at a relatively slow rate so that a relatively low audio frequency (typically 1 KHz) square wave is developed across load resistor 106. In response to the collector of transistor 96 being at a relatively high level, additional charging current is provided for capacitor 103 to increase the oscillation frequency of transistor 101, whereby a second, higher audio frequency voltage (typically 1.5 KHz) is developed across load 106. Audio tones at 1 and 1.5 KHz are considerably easier to hear than 7 KHz tones coupled to the coil assembly.

The bi-frequency voltage developed across load resistor 106 of oscillator 19 is fed to the base of transistor 111 which is included in gate 21. The collector of transistor 111 is d.c. coupled via resistor 112 to the collector of transistor 96 so that it can be forward biased in response to transistor 96 being driven into a conducting state. The forward bias applied to transistor 111 from the collector of transistor 96 causes the gain of transistor 111 to be relatively high and constant, whereby the 1.5 KHz signal is derived with constant amplitude across resistor 112.

The collector of transistor 111 can also be variably biased to a level dependent upon the amplitude of the d.c. voltage derived by rectifier 18. To this end, the collector of transistor 111 is d.c. coupled via resistor 113 to the variable voltage developed across resistor 81 and capacitor 82 of rectifier 18. If transistor 96 is in a conducting state, the variable d.c. level fed to the collector of transistor 111 via resistor 113 has no effect on the gain of transistor 111 because the voltage developed across resistor 81 and capacitor 82 is lower than the voltage at the collector of transistor 96 and the low impedance of the transistor emitter collector path to the plus 6 volt source. However, in response to transistor 96 being cut off, whereby ground voltage is applied to one end of resistor 112, the gain of transistor 111 is controlled by the voltage developed across resistor 81 and capacitor 82 such that the transistor gain increases as the voltage across resistor 81 and capacitor 82 increases, whereby the transistor output voltage is a direct function of the a.c. voltage derived from coils 12 and 13.

The voltage developed at the collector of transistor 111 is a.c. coupled via capacitor 112 to the base of transistor 113 which comprises audio amplifier 22. Connected in the collector circuit of transistor 113 is the primary winding of audio transformer 114, the secondary of which is connected to an electrical to aural transducer 23, which may be a loudspeaker and/or a set of head phones.

Figure 3:
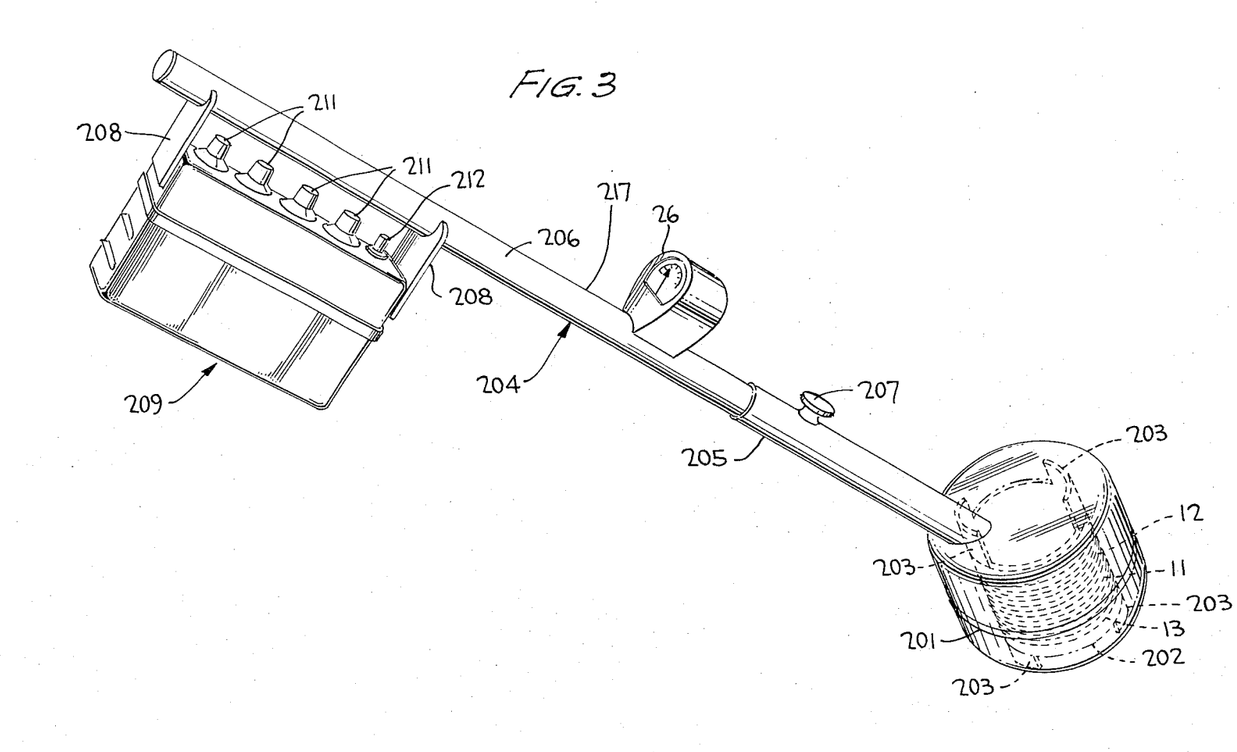
FIG. 3 is a perspective and partially phantom view of a portable device embodying the principles of the present invention and particularly adapted for use in detecting and distinguishing between sub-surface ferrous and conductive bodies.

Reference is now made to FIG. 3 of the drawing wherein there is illustrated a perspective and partially phantom view of a portable instrument embodying the principles of the present invention and particularly adapted for use in detecting and distinguishing between sub-surface ferrous and conductive bodies. The device illustrated includes a cylindrical head portion 201, manufactured of a dielectric, non-ferrous material, such as plastic. Fixedly mounted inside of head portion 201 is dielectric, non-ferrous, temperature stable cylinder 202 which is preferably fabricated of certain glasses. Cylinder 202 is held in situ by suitable retaining ribs 203 (or foam insulation) which are fixedly mounted between it and the interior of head 201. Rigid polyurethane foam provides thermal insulation from the surface of housing 21 to cylinder 202 and the components thereon, as well as cushioning for mechanical isolation to prevent cylinder deformation or impact breakage. Cylinder 202 comprises a carrier for coaxial, vertically oriented transmitting and receiving coils 11-13.

Head 201 is fixedly secured to a hollow cylindrical wand 205 that is fabricated of a non-metallic material so that it does not distort the magnetic field of the assembly comprising coils 11-13. Wand 204 is divided into a lower, plastic segment 205 which is fixedly connected to an upper, non-magnetic, metallic segment 206, which may be fabricated from aluminum. The handle 217, consists of a segment of 206. Meter 26, which provides an indication of the phase angle amplitude derived from phase comparator 24, is mounted on the upper portion 206 of the wand to enable the operator to readily obtain a visual indication of the phase shift caused by a conductive body.

Mounted below the upper portion of the metallic portion 206 of wand 204 is housing 209 for the electronic circuitry illustrated in FIG. 2. Housing 209 is fixedly mounted on wand segment 206 by clamps 208. Circuitry within housing 209 is connected to the assembly including coils 11–13 and meter 26 via leads that run through the interior of hollow wand 204. Positioned on the upper surface of container 209 and beneath the lower surface of wand 204 are knobs 211 which control the settings of the sliders 58, 59, 66 and 93 which control nulling, amplitude sensitivity and phase sensitivity of the instrument. On-off switch 212 is also mounted on the upper surface of container 209 beneath wand 204. By positioning the control knobs 211 and on-off switch 212 between the upper surface of housing 209 and the lower surface of wand 204, the possibility of the controls being inadvertently adjusted is materially obviated. Housing 209 also includes an electroacoustic transducer, in the form of a loudspeaker (not illustrated) or a jack (not illustrated) particularly adapted for enabling a set of headphones to monitor the generated audio tone. Power for the circuitry within housing 209 is provided by batteries located inside of wand 204.

In use, the operator grasps handle 217 with one hand and with the other hand is able to adjust controls 211. The instrument is swung at a relatively rapid rate by the operator as he walks over an area of interest until an aural tone is detected. In response to the aural tone being detected, the operator stops walking and slowly swings the instrument until the amplitude of the aural tone reaches a maximum or the deflection of mter 26 reaches a maximum. The operator is thereby apprised of the location and character (ferrous or conductive) of the body.

While there has been described and illustrated one specific embodiment of the invention, it will be clear that variations in the details of the embodiment specifically illustrated and described may be made without departing from the true spirit and scope of the invention as defined in the appended claims. For example, the sensing head can be altered with regard to geometry, configuration and size. Variations can be provided for the frequencies of oscillators 14 and 19. For certain types of targets, it may be desirable to use multiple coil excitation frequencies that may be manually selected or derived by frequency sweeping techniques. Multiple excitation frequencies may be simultaneously fed to the transmitting coil, in which case plural detection channels are provided, one for each of the excitation frequencies. It is also possible to reverse the variable amplitude relationship for the ferrous and non-ferrous indications, whereby the non-ferrous indication is derived as a tone of variable intensity and the ferrous indication is visually read from a meter.

I claim:

1. Apparatus for detecting and distinguishing between ferrous and electrically conductive bodies comprising coil means, a constant frequency a.c. source connected to said coil means to excite said coil means so that the coil means generates an a.c. magnetic field, said coil means being arranged so that in response to: (a) neither a ferrous body nor a conductive body being in the field there is generated by the coil means a substantially zero a.c. voltage, (b) a ferrous body being in the field there is generated by the coil means a non-zero a.c. voltage having a predetermined phase relative to the phase of the a.c. excitation voltage for the coil means, and (c) a conductive body being in the field there is generated by the coil means a non-zero a.c. voltage having a phase displaced from said predetermined phase relative to the phase of the a.c. excitation voltage; detector means responsive to the magnitude and phase of the voltage generated by the coil means for generating a first, variable amplitude aural signal in response to the coil means generating non-zero a.c. voltage having the predetermined phase with respect to the a.c. excitation voltage and for generating a second aural signal in response to the coil means generating a non-zero a.c. voltage having a phase displaced from said predetermined phase, said first and second aural signals being at differing frequencies to produce tones aurally distinguishable from each other, said variable amplitude being responsive to the amplitude of the a.c. voltage.

2. Apparatus for detecting and distinguishing between ferrous and electrically conductive bodies comprising coil means, a constant frequency a.c. source connected to said coil means to excite said coil means so that the coil means generates an a.c. magnetic field, said coil means being arranged so that in response to: (a) neither a ferrous body nor a conductive body being in the field there is generated by the coil means a substantially zero a.c. voltage, (b) a ferrous body being in the field there is generated by the coil means a non-zero a.c. voltage having a predetermined phase relative to the phase of the a.c. excitation voltage for the coil means, and (c) a conductive body being in the field there is generated by the coil means a non-zero a.c. voltage having a phase displaced from said predetermined phase relative to the phase of the a.c. excitation voltage; means for selectively generating an output signal selectively having first and second different distinguishable frequency components, phase detector means connected to be responsive to the coil means generating a non-zero a.c. voltage having a phase differing by at least a preselected value from the predetermined phase for activating the means for generating the signal output so only the first component is derived thereby, said means for generating the signal output generating only the second component while the coil means derives an a.c. voltage having the predetermined phase, means for varying the amplitude of the second component in response to the amplitude of the voltage generated by the coil means, and output means responsive to the first component and the second component with the variable amplitude.

3. The apparatus of claim 2 wherein said frequencies are audio frequencies and said output means comprises means for generating distinguishable aural signals having tonal frequencies respectively corresponding to said first and second audio frequency components.

4. The apparatus of claim 3 wherein the phase detector means includes means for generating a voltage amplitude indicative of the phase difference of the voltage generated by the coil means relative to the predetermined phase, and further output means for visually indicating the phase indicating voltage amplitude.

5. The apparatus of claim 2 further including variable gain means connected between the winding means and the phase detector means, as well as the means for varying the amplitude.

6. The apparatus of claim 2 wherein the coil means includes an excitation coil means and first and second differential windings respectively disposed on opposite sides of said first coil means, a common terminal for one end of each of said differential windings; a nulling circuit including first and second terminals respectively connected to second ends of said differential windings, voltage divider means connected between said first and second terminals, said voltage divider means including a pair of taps, means for connecting one of said taps to said common terminal without introducing any substantial phase shift, and means for connecting the other of said taps to said common terminal with the introduction of approximately 90° phase shift.

7. Apparatus for detecting and distinguishing between ferrous and electrically conductive bodies comprising coil means, a constant frequency a.c. source connected to said coil means to excite said coil means so that the coil means generates an a.c. magnetic field, said coil means being arranged so that in response to: (a) a ferrous body being in the field there is generated by the coil means a non-zero a.c. voltage having a predetermined phase relative to the phase of the a.c. excitation voltage for the coil means, and (b) a conductive body being in the field there is generated by the coil means a non-zero a.c. voltage having a phase of the a.c. excitation voltage; phase detector means responsive to the phase of the a.c. voltage generated by the coil means, a voltage controlled oscillator for generating a signal having a frequency controlled by the phase indication generated by the phase detector, and means for controlling the amplitude of the signal frequency generated by the oscillator in response to the amplitude of the a.c. voltage generated by the coil means.

8. The apparatus of claim 7 wherein the phase detector means includes means for generating a bilevel signal voltage indicative of the phase of the a.c. voltage deviating by at least a predetermined amount from the predetermined phase, said voltage controlled oscillator being responsive to the bilevel signal voltage.

9. The apparatus of claim 8 further including output means, and wherein the coil means is arranged so that in response to neither a ferrous body nor a conductive body being in the field there is generated by the coil means a substantially zero voltage, the amplitude control means including means responsive to the bilevel signal for feeding the frequency generated by the oscillator to the output means with substantially constant amplitude while one of the levels is derived, and means for feeding the frequency generated by the oscillator to the output means at an amplitude that tends to follow the amplitude of the a.c. voltage generated by the coil means while the other level is derived.

10. The apparatus of claim 8 further including means for at will controlling the predetermined phase.

11. The apparatus of claim 7 wherein the coil means is arranged so that in response to neither a ferrous body nor a conductive body being in the field there is generated by the coil means a substantially zero voltage, and means for feeding the frequency generated by the oscillator to the output means at an amplitude that tends to follow the amplitude of the a.c. voltage generated by the coil means while the other level is derived.

12. Apparatus for detecting and distinguishing between ferrous and electrically conductive bodies comprising coil means, a constant frequency a.c. source connected to said coil means to excite said coil means so that the coil means generates an a.c. magnetic field, said coil means being arranged so that in response to: (a) a ferrous body being in the field there is generated by the coil means a non-zero a.c. voltage having a predetermined phase relative to the phase of the a.c. excitation voltage for the coil means, and (b) a conductive body being in the field there is generated by the coil means a non-zero a.c. voltage having a phase displaced from said predetermined phase relative to the phase of the a.c. excitation voltage; phase detector means responsive to the phase of the a.c. voltage derived from the coil means for generating a bilevel signal voltage indicative of the phase of the a.c. voltage deviating by at least a predetermined amount from the predetermined phase, a voltage controlled oscillator for generating a signal having audio frequencies $F_1$ and $F_2$ in response to the phase indication generated by the phase detector, said frequencies $F_1$ and $F_2$ being respectively generated in response to the first and second levels of the bilevel signal voltage, means for controlling the amplitude of the frequency $F_1$ signal generated by the oscillator in response to the amplitude of the a.c. voltage generated by the coil means while the first level is generated and for maintaining the frequency $F_2$ signal amplitude constant while the second level is generated, and aural output means responsive to the variable and constant amplitude signals of frequencies $F_1$ and $F_2$, said $F_1$ and $F_2$ frequencies being aurally distinguishable from each other.

13. The apparatus of claim 12 wherein the phase detector means includes means for generating a d.c. output voltage approximately proportional to the phase of the a.c. voltage generated by the coil means, and a d.c. voltmeter connected to be responsive to the d.c. voltage for visually displaying an indication of the d.c. voltage.

14. The apparatus of claim 12 further including means for varying the phase deviation required to change the level of the bilevel signal voltage.

15. The apparatus of claim 12 further including variable gain means connected between the coil means and the phase detector and the means for controlling the amplitude of the $F_1$ frequency signal.

* * * * *